UNITED STATES PATENT OFFICE.

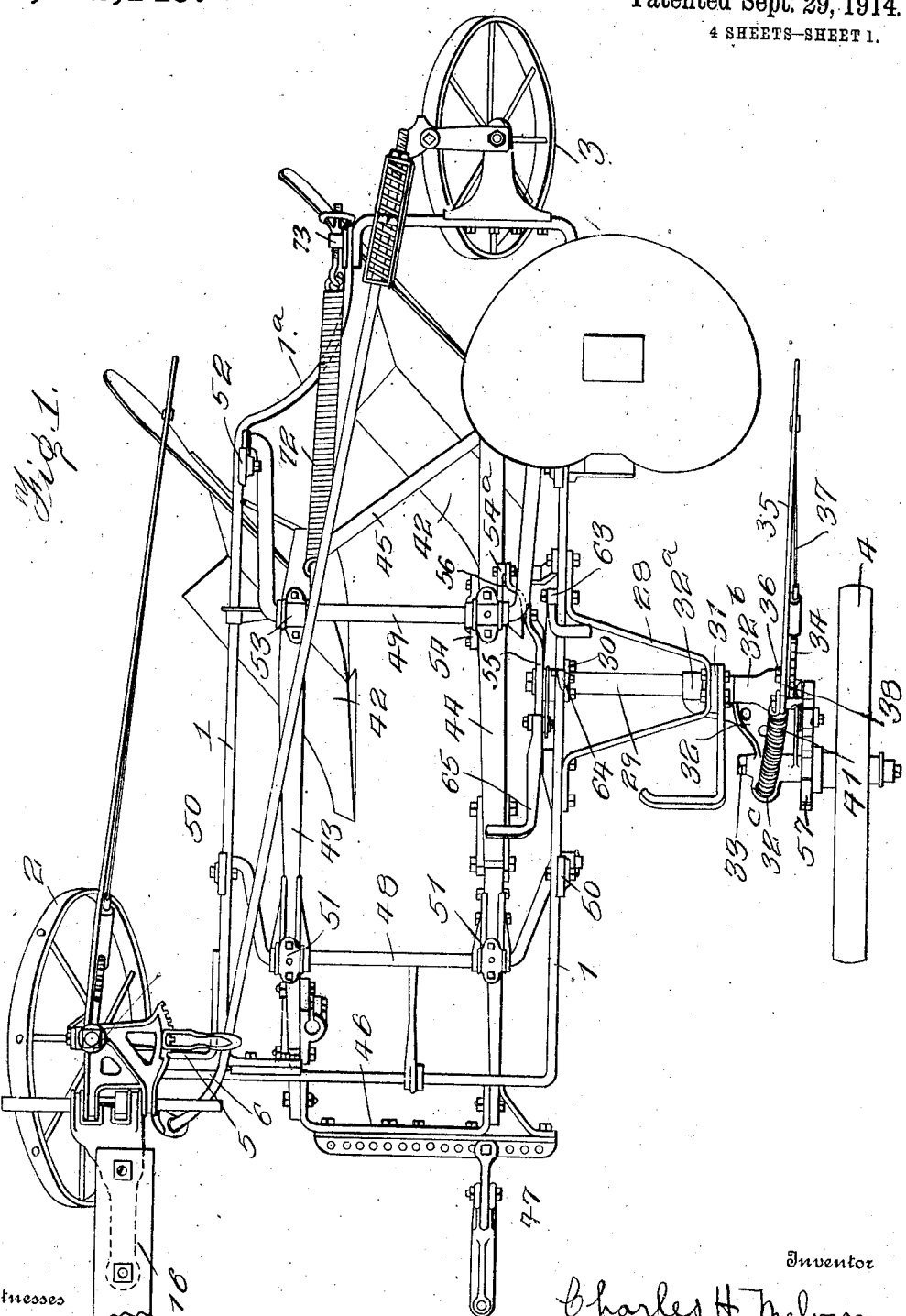

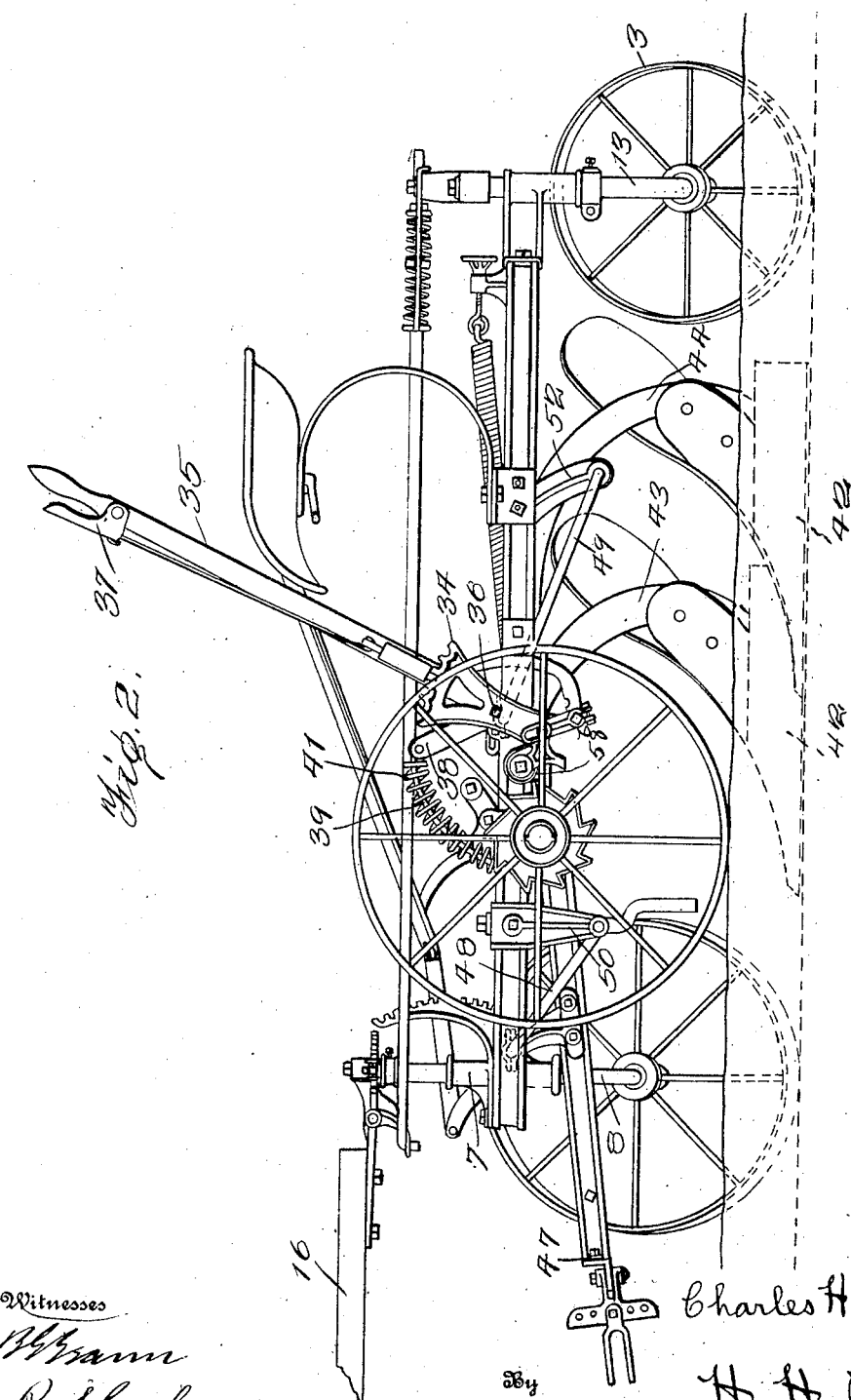

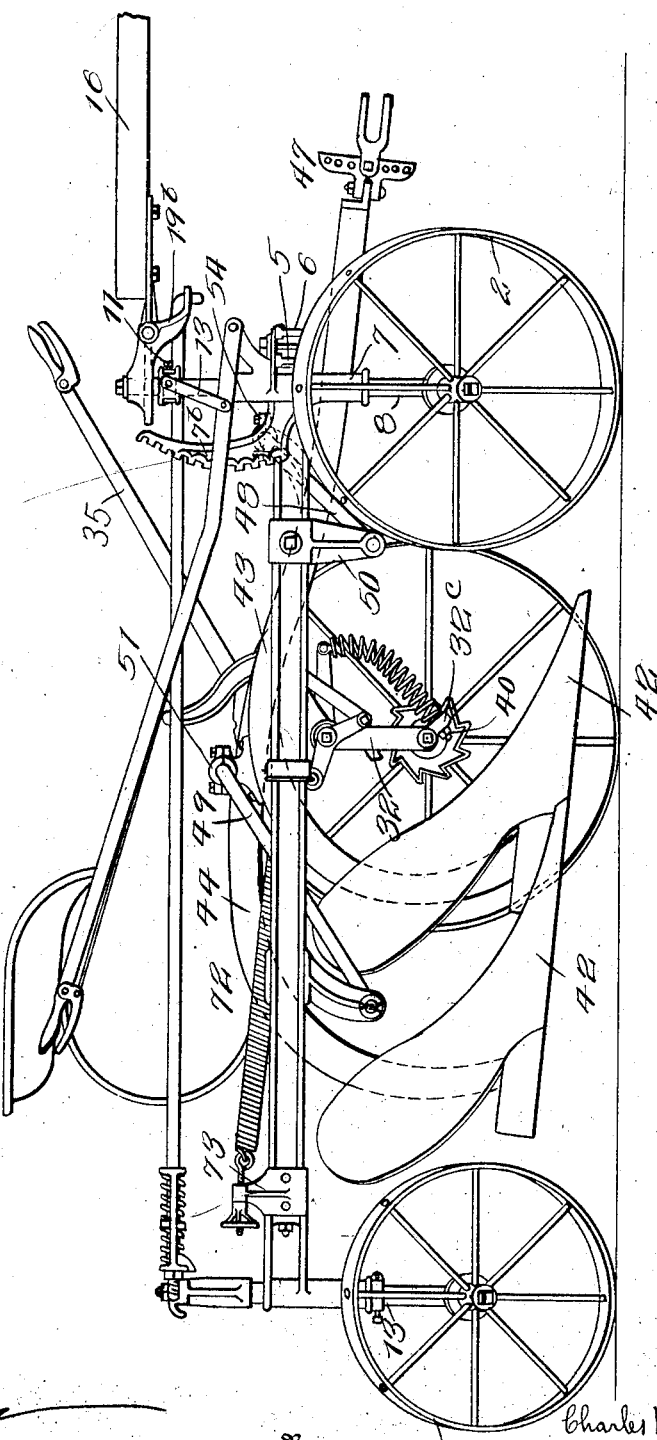

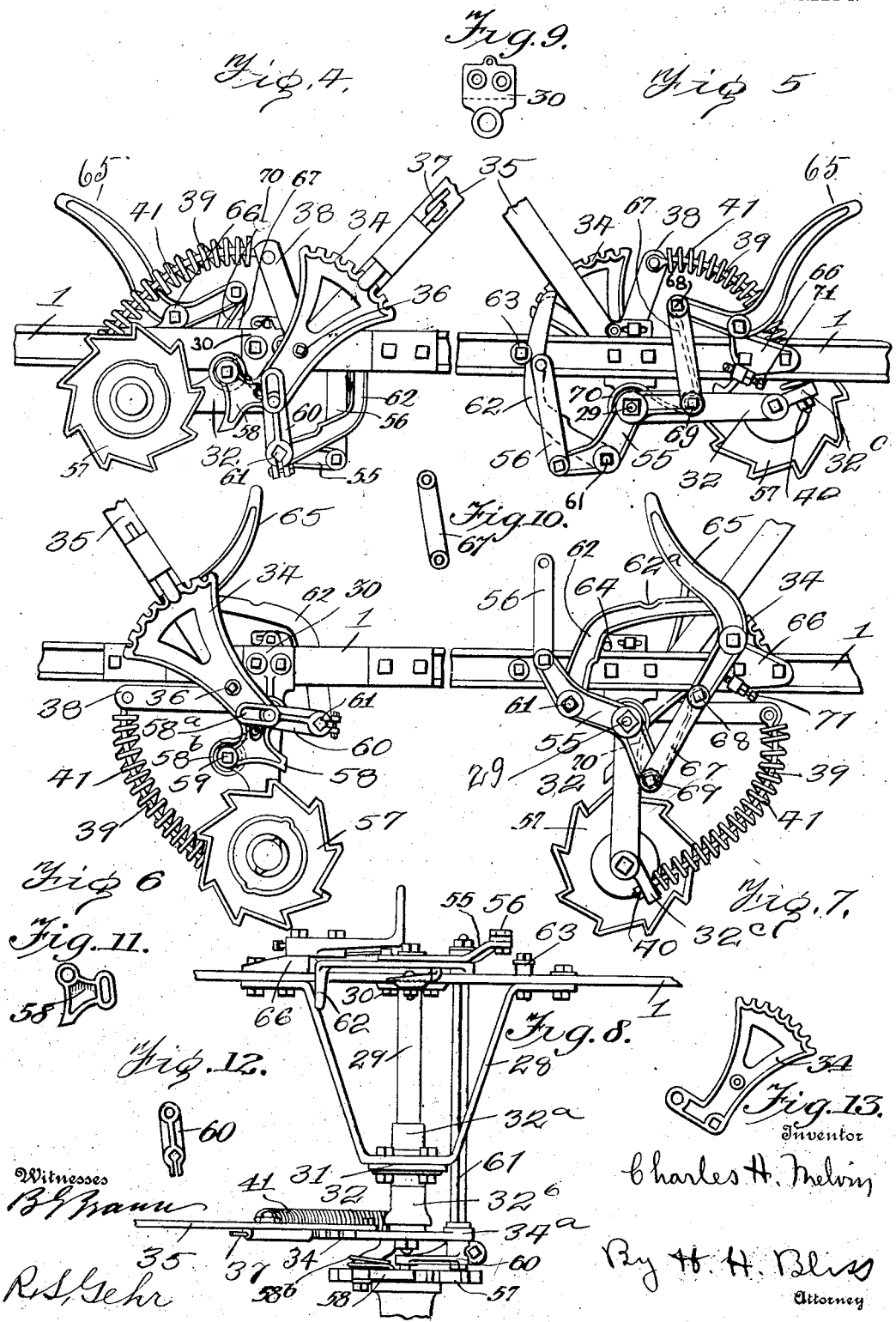

CHARLES H. MELVIN, OF MOLINE, ILLINOIS, ASSIGNOR TO DEERE & COMPANY, A CORPORATION OF ILLINOIS.

PLOW.

1,112,149.   Specification of Letters Patent.   Patented Sept. 29, 1914.

Application filed July 29, 1908. Serial No. 445,978.

*To all whom it may concern:*

Be it known that I, CHARLES H. MELVIN, a citizen of the United States, residing at Moline, in the county of Rock Island and State of Illinois, have invented certain new and useful Improvements in Plows, of which the following is a specification, reference being had therein to the accompanying drawing.

This invention relates to improvements in sulky plows of the class including those machines of which each employs a main frame held normally substantially rigidly in relation to the ground surface, when the plows are in operation, and serving as a constantly level abutment structure. This frame must be capable of rising and falling, when desired, relatively to the ground surface, although supported firmly at three points; it must support the plows vertically in such manner that they cannot depart from predetermined depths of plowing, yet so that they can be manually adjustable, vertically, to any of several working positions and also to their uppermost or idle position; it must withstand all of the side draft thrusts exerted upon the mechanism, as an entirety, that are transmitted to it from the furrow wheels. It is in contradistinction from the mechanisms which have two ground wheels around which the plowing elements, proper, vibrate vertically, there being no other point of ground support; dependence being placed upon the neck yoke of the team to limit such vibrations of the plow and beam.

The object of the invention is to provide, first, a three-wheel supporting framework, from which the plows are suspended, and, second, a novel, optionally operable, power-actuated, lifting mechanism adapted to translate in a short interval of time all, or a large part, of the force exerted by the draft and transmit it, partly, to the frame and partly to the plows so as to lift the first relatively to the ground and lift the plows relatively both to the frame and to the ground without requiring any labor on the part of the operator; and to accomplish these ends in such way that the frame structure will automatically maintain itself in parallelism to the ground surface at all times, whether the plows are in the ground and at work, or are elevated and idle.

All of the objects of my invention and the features of construction which I employ to attain these objects will be understood from the following description in connection with the accompanying drawings.

In the drawings Figure 1 is a plan view of a plow embodying my invention. Fig. 2 is a left side elevation of this plow. Fig. 3 is a right side elevation. Figs. 4 and 5 are left and right side elevations respectively of the plow-lifting mechanism showing the parts in the positions occupied when the plow bodies are lowered. Figs. 6 and 7 are similar views showing the parts in the positions they occupy when the plow bodies are raised, and Fig. 8 is a plan view of the mechanism as shown in Fig. 6. Figs. 9 to 13 show details.

Referring now to the construction in detail, 1 is the main frame which is preferably formed of steel bar stock and is rectangular in general outline except for the inwardly curved part at 1ª. This frame is supported upon the furrow wheels 2 and 3 and a land wheel 4. The right forward corner of the frame 1 is provided with laterally extending bars 5 and 6 upon which is mounted a sleeved bracket 7. In the bracket 7 is rotatably mounted the upright spindle part of the axle 8 upon which the furrow wheel 2 is mounted. Suitable means, such as shown in the drawings, are provided for adjusting the frame up and down on the spindle 8, but these means need not be described as tably mounted the upright spindle part of the invention. A steering tongue or pole 16 is connected to the upper end of the spindle 8 and serves to turn the furrow wheel 2 so as to guide the machine.

The rear furrow wheel 3 is mounted upon an upright swiveling spindle 13 in the usual manner, and this spindle is connected, as shown, with the steering pole 16 so that the wheels 2 and 3 are swung in unison when the machine is turned. Steering devices of this character are well known in the art, and those shown in the drawing need not therefore be described in detail. The rear furrow wheel and the frame are vertically adjustable in relation to each other in any well known manner, as indicated in Fig. 2.

To provide a mounting for the land wheel 4, a frame extension 28 is secured to the side of the main frame and a rock shaft 29 is rotatably mounted in brackets 30 and 31 secured to the main frame and the outer end of the extension 28 respectively. A radius arm 32 is rotatably mounted on the outer end of the shaft 29, said arm being preferably a casting formed with sleeve parts 32$^a$ and 32$^b$ which surround the shaft 29 and between which is disposed the bearing part of the bracket 31, the latter thus serving to hold the radius arm 32 against lateral movement relative to the plow frame. An axle 33 is mounted in the outer end of radius arm 32 and on this axle the land wheel 4 is mounted.

The radius arm 32, as stated above, is loosely sleeved on the shaft 29, but it is adjustably and yieldably held against turning upon the shaft. A toothed segment 34 is rigidly secured to the end of shaft 29 and a hand lever 35 is pivotally mounted at 36 on said segment, the hand lever being provided with a thumb latch device 37 which engages the teeth of the segment to hold the latter and the hand lever in any desired relation within the limits of the segment. The hand lever carries a crank arm 38 to the end of which is pivotally secured an arcuate rod 39, the lower end of which extends through an aperture in a lug 32$^c$ formed on the radius arm 32 and is provided with a nut 40 to prevent its withdrawal from said lug. A coil spring 41 is mounted on the rod 39 between the end of the arm 38 and the lug 32$^c$.

The land wheel mounting constructed as described is such that the axle of the wheel may swing downward and backward, and I employ this movement for the twofold purpose of effecting the lifting of the plow bottoms and the leveling of the frame. It is clear that the radius arm 32 and with it the land wheel 4 may be swung downward and backward by simply throwing the hand lever forward, but I prefer to effect this movement by means of the draft of the team.

The plow bodies 42, of which two are shown in the construction illustrated, are carried by beams 43, 44, which are rigidly secured together by cross bars 45 and 46 so as to form a rigid frame by which the plow bodies are supported. To the front cross bar 46, draft devices 47 are attached. The plow beams are connected to the wheel frame 1 by means of front and rear cranks or bails 48 and 49, the latter being preferably longer than the former so as to give the rear ends of the plow beams a greater range of movement than their front ends when the plows are raised and lowered. The ends of the front bail 48 are pivotally mounted in brackets 50 which depend from the main frame 1, and each of the plow beams carries an upstanding bracket 51 having a bearing box which embraces the transverse part of the bail. The bail 49 has its ends similarly mounted in brackets 52 which depend from the frame 1, and the two plow beams are provided with bearing brackets 53, 54, which embrace the transverse part of the bail. When the plows are elevated, it is clear that their movement in relation to the wheel frame 1 will be determined by the bails 48 and 49.

To effect the elevation of the plows though the rocking of the shaft 29, a cross head or lever 55 is mounted on the inner end of the shaft 29 and a link 56 connects one end of this cross head with an arm 54$^a$ formed on the bearing bracket 54. With this connection it is clear that when the radius arm 32 swings rearward, the plows will be lifted and when it swings forward, the plows will be lowered. To effect this movement through the draft of the team, the following construction is provided: 57 is a ratchet wheel, preferably formed integral with the hub of the land wheel 4. 58 is a pawl pivotally mounted at 59 on an extension of the radius arm 32 and adapted to be swung into the path of the teeth of ratchet wheel 57 so as to lock said wheel and with it the land wheel 4 against forward rotation relative to the radius arm 32. The pawl 58 is normally held out of engagement with the ratchet wheel 57 by a spring 58$^b$ and is moved into engagement with said ratchet wheel by means of a crank 60 which engages a slot 58$^a$ in the pawl. The crank 60 is mounted on the end of a shaft 61 which has a bearing support at its outer end in an extension 34$^a$ of the segment 34, and at its inner end in the cross head 55. A foot lever 62 is rigidly mounted on the shaft 61 at a point adjacent the cross head 55 and just inside the side bar of the main frame 1. When the foot lever 62 is moved forward, it rocks the shaft 61 forward and through the crank 60 throws the pawl 58 down into engagement with the ratchet wheel 57. A stop 63 is mounted on the frame 1 in position to engage a notch 62$^a$ formed in the foot lever 62, when said lever is in its normal position as shown in Figs. 4 and 5, the engagement of the notch 62$^a$ with the stop 63 tending to hold the cross head 55 in the position shown in Fig. 5, but yet allowing the rear end of the cross head to rise in case the plows are lifted by striking an obstruction. The forward movement of the foot lever 62 is limited by a stop 64 which is adjustably mounted on the frame 1. When the cross head 55 moves from the positions shown in Fig. 5 to that shown in Fig. 7, the foot lever 62 comes into engagement with the stop 64 and the continued movement of the cross head causes the shaft 61 to turn or lift so as to withdraw the pawl 58 from engagement with the ratchet wheel 57, and as the plows are at this time elevated, some means must be provided to hold the cross head 55 in position shown in Fig.

7. For this purpose I have devised a toggle lever construction which comes into action automatically to effect the locking of the cross head in the position shown in Fig. 7, and which may be released by a mere touch of the operator's foot. This toggle lever mechanism comprises a foot lever 65 which is pivotally mounted on a bracket 66 secured to the side bar of the frame 1, and a link 67 which is connected at one end by means of a pivot bolt 68 to the lower end of the said foot lever 65, and at its other end is connected by means of a pivot bolt 69 to the forward end of the cross head 55. A spring 70 is coiled about the pivot bolt 69 and has one of its ends extending back over the shaft 29, and its other end extending upward or forward around the pivot bolt 68. The action of the spring as thus mounted is to throw the joint formed by the pivot bolt 68 forward, such forward movement being arrested just after the bolt 68 passes the line of centers by means of an adjustable stop screw 71.

With this construction it is clear that the weight of the plows tends to return the cross head 55 from the position shown in Fig. 7 to the position shown in Fig. 5, but that this movement is prevented by the toggle mechanism 65, 66, 67, the toggle joint at 68 being firmly held in this position just past the dead center by the spring 70 and the weight of the plows. At the same time, the operator can easily overcome the action of the spring and weight by pressing the foot lever 65 forward thus moving the toggle joint 68 backward past the line of centers so as to start the lowering movement of the plows which is then continued automatically, the weight of the plows and connected parts being effective to carry the plow bottoms down into operative engagement with the ground.

A heavy coil spring 72 is connected at its forward end to the bearing bracket 53 and at its rear end to a bracket 73 on the wheel frame 1, the action of the spring being to assist in the lifting of the plows.

The operation and manner of handling the plow will be readily understood from the above description. On entering the field with the plows in their elevated position, as shown in Fig. 3, the operator having determined the depth of cut by properly adjusting the height of the frame with respect to the furrow wheels and by properly adjusting the land wheel by means of the hand-lever 35, the plows are lowered by the operator pressing forward on the foot lever 65, thus releasing the toggle lock and allowing the plows to descend under the action of gravity and the land wheel to swing forward. As the plow bodies move downward, they take into the ground point first by reason of the difference in the lengths of the bails 48 and 49, the bottoms finally taking the position shown in Fig. 2. As the machine moves forward the plow bodies are supported from the wheel frame in a floating condition, said bodies being free on the one hand to ride upward over any obstruction such as a rock, and the land wheel being capable of rising more or less against the tension of the spring 39 so as to pass over any inequality in the surface of the ground without materially affecting the position of the plow bodies. In turning at the corners the furrow wheels are angled in the well known manner by the swing of the steering pole 16, the movement of which is transmitted to both of the axles 8 and 13 in a manner which will be apparent from an inspection of the drawing. When it is desired to lift the plow bodies, the operator presses forward on the foot lever 62 thus swinging the pawl 58 into engagement with the ratchet wheel 57 so as to lock the land wheel against forward rotation relative to the radius arm upon which said wheel is mounted. The wheel being thus locked, the draft of the team becomes effective to swing the wheel and radius arm bodily downward and backward thus rocking the shaft 29 forward and swinging the rear end of the cross head 55 upward so as to lift the plow beams and bodies, and at the same time the swing of the radius arm and land wheel acts to raise the land side of the wheel frame so that the latter is horizontal when the furrow wheels move out of the furrows on to level ground. As the land wheel swings backward, the segment extension 34$^a$, the rear end of the cross head 55 and the shaft 61 move in unison, the pawl 58 meanwhile remaining in engagement with the ratchet wheel 57. As this movement continues, however, the foot lever 62 finally comes into engagement with the stop 64 as shown in Fig. 7 so that the further swinging movement results in the turning of the shaft 61 so as to withdraw the pawl 58 from engagement with the ratchet wheel. This disengagement of the pawl is timed to occur just as the toggle joint at 68 passes the line of centers, the plows being thus locked in their elevated position.

I am aware of the fact that sulky plows have been heretofore made with three wheels. Generally there are two furrow wheels, one for the front furrow and one for the rear, and a land wheel. In some cases the plow beam or standard has been directly secured to the rear furrow wheel, the latter being independent of the other wheels as concerns the means for attaching and supporting it. In other cases the three wheels have been connected to a common frame and the plow has been suspended therefrom. But, so far as I am aware, no way has ever been devised, and no means have ever been provided prior to my invention for causing the automatic adjustment (from one horizontal plane to another) of this common main frame, or of any part thereof, and simultaneously causing the automatic lifting or adjusting of the plows both in relation to the ground and in relation to the main frame. If the plows are lifted out of the ground it will be seen that the furrow side of the structure will, either at the rear end or at both ends, be instantly elevated. When this lifting of the plows from their work occurs at the end of a line of plowing this lifting of one side only of the frame occurs both at the front and at the rear.

In the present mechanism the parts are so constructed and related that at the time the furrow wheels are being raised and brought from the bottoms of the furrows to the level of the land (and consequently inclining the machine as a whole from the plowed ground toward the land), the operator can instantly cause a compensating lift on the land side of the frame to simultaneously occur, as he can translate some of the draft force into a vertically upward acting force to lift the frame, this occurring simultaneously with the bringing of the plows out of the ground and elevating them to their inactive position.

In the mechanism illustrated, the plows are, as above described, suspended from the frame by two bails. The power transmitting mechanism for lifting them is constructed and mounted independently of these, it comprising the power shaft arranged to rock on the frame, and the interposed transmitting devices which connect it to the plows. This transmitting mechanism (the rock shaft and adjuncts) is also connected to the land wheel, which, from the above description, it will be seen, can, when permitted, move bodily relatively to the furrow wheels under the force of the draft. The motion of these parts results in a motion of the parts of the power transmitter, which motion becomes, partly, an upward leveling movement of the main frame, and partly a simultaneous travel upward of the plows relatively to the main frame and relatively to the ground surface.

By having the power transmitting devices constructed and supported on the frame independently of the plow suspending devices, I am enabled to arranged the power transmitter to advantage. I place the axis of the radius arm relatively low, use a land wheel of relatively short radius, and give it a quick swing backward. By having it of short diameter, it responds quickly to the draft, after the locking action of the pawl occurs. It is desirable to bring the plow points upward on a line as little inclined as possible, and as near as can be to the perpendicular. If the frame, the wheel, the radius arm and the parts actuated thereby are so made and related that the frame must travel forward a relatively long distance, after the plow points begin to rise, they cut a long inclined path through the soil before escaping from it. But, in the present construction, the separately mounted power transmitting mechanism, the relatively small wheel and the relatively quickly swinging radius arm, insure that the frame shall travel forward a short distance between the points or out of the ground.

The draft devices forward of the plowing mechanism are relieved of all strain during the lifting and leveling of the plows and the frame. When two, three, or four, plow bottoms are at work and embedded in the earth, it requires a powerful force to bodily draw them upward. There must be an accompanying and equilibrating action downward. In a two wheel frame structure this reaction is partly taken upon the tongue extending forward to the neck yoke of the team. In the present mechanism, plows being suspended entirely from the frame, and the frame being supported in substantially fixed relations to the ground, without having incidental to it any vibrations around transverse lines, all of the heavy load is taken by the frame and transmitted, without vibrations at either end, upon the ground wheels.

In case it becomes necessary to lift the plows when the machine is not in motion, the hand lever 35 is, of course, available for this purpose.

What I claim is:

1. In a plowing mechanism adapted to have draft or propelling power applied thereto, the combination of the front furrow wheel, a rear furrow wheel, the land wheel, a frame supported on said three wheels and normally held bodily fixed relatively to the ground but adapted to be vertically moved relatively to one or more of said wheels, plows vertically movable relatively to the frame, a front bail and a rear bail for connecting the frame and the plows, a rock shaft supplemental to and independent of the bails, a power transmitter interposed between and movable relatively to the rock shaft and the plows, means operable at will for locking the rock shaft to one of the ground wheels whereby the said wheel can transmit draft force through said rock shaft to lift the frame relatively to the ground and simultaneously lift the plows relatively to the frame.

2. The combination of the ground wheels, the frame carried thereupon and supported at three points bodily in rigid relation to the ground, but adapted to be automatically moved vertically relatively to the ground, the plow, a front bail and a rear bail connecting the plow to the frame, a rock shaft supplemental to, and mounted independently of, the bails, a crank arm on said rock shaft connected to the plow, a radius arm connected to said shaft and having one of the ground wheels mounted eccentrically thereon as to the arm's axis, and optionally operable means for locking the radius arm to the wheel whereby said wheel can transmit the draft force to rock the shaft and to lift the frame with respect to one or more of its points of ground support and simultaneously lift the plows in the frame.

3. The combination of the front furrow wheel, the rear furrow wheel, the land wheel, the frame normally supported by said wheels in fixed relation to the ground and optionally adjustable upon each of them and automatically liftable upon one, means for supporting the plow upon the frame comprising one or more bails extending forward and upward from the frame to the plows, the draft devices connected directly to the plows, and power transmitting devices actuated by the draft devices to lift the frame relatively to the ground and lift the plows relatively to the frame.

4. The combination of the front furrow wheel, the rear furrow wheel, the land wheel, the frame normally supported thereon in fixed relation to the ground but adapted to be optionally adjusted on each of said wheels and to be automatically lifted relatively to the ground, a plow movably connected to the frame, a swinging radius arm on the frame on which arm the land wheel is mounted, lifting devices between the said arm and the plow, means for yieldingly holding the arm in normal position, means for causing the wheel to swing the radius arm backward to lift the frame away from the ground and to simultaneously lift the plow in the frame as set forth.

5. The combination of the front furrow wheel, the rear furrow wheel, the land wheel, the frame which is supported on said wheels and is normally held bodily in fixed relation to the ground but is adapted to be automatically lifted on the land side, a plow movably connected to the frame, a rock shaft on the frame, lifting connections between the rock shaft and the plow, a radius arm loosely sleeved on the rock shaft and carrying the land wheel at its free end, yielding connections between the rock shaft and the radius arm, and means for causing the wheel to swing the radius arm backward to lift the land side of the frame and to simultaneously lift the plows in the frame.

6. In a plowing mechanism adapted to have draft mechanism applied thereto, the combination of the front furrow wheel, the rear furrow wheel, the land wheel adapted to be automatically moved bodily relatively to, and independently of, the furrow wheels under the force from the draft mechanism, a frame supported on said three wheels and normally held bodily fixed relatively to the ground but adapted to be moved vertically relatively to the land wheel, plows movable relatively to the frame, power-transmitting mechanism mounted on the frame independently of the plows and connected to the plows for moving them, means connecting the power-transmitter with the land wheel and movable therewith relatively to the frame and to the plows, and an optionally controlled lock for said connecting means, the said parts being arranged substantially as set forth to have the power mechanism actuated from the force of the draft to lift the frame relatively to the ground and simultaneously lift the plows relatively to the frame.

7. In a plowing mechanism adapted to have draft mechanism connected thereto, the combination of the front furrow wheel, the rear furrow wheel, a vertically movable land wheel, a frame supported on said three wheels and normally held bodily fixed relatively to the ground, but adapted to be vertically moved relatively to the wheels, movable plow supports on the frame, a power shaft supplemental to said supports mounted on the frame, power-transmitting devices between the shaft and the plows, a power-transmitter between the land wheel and the shaft, and optionally controlled means for permitting or preventing the land wheel from actuating the shaft, said parts being arranged substantially as set forth whereby the land wheel can be bodily moved vertically under the force of the draft and elevate the frame and cause the said power-transmitting devices to lift the plows thereon.

8. In a plowing mechanism adapted to have draft mechanisms applied thereto, the combination of the front furrow wheel, the rear furrow wheel, a bodily movable land wheel, a frame supported on said three wheels and normally held bodily fixed relatively to the ground but adapted to be vertically moved relatively thereto, plows vertically movable relatively to the frame, vertically movable supports between the frame and the plows, a power shaft mounted on the frame, power-transmitting devices connecting said shaft to the plow supports, means connecting said shaft to the land wheel and movable when the land wheel is moved bodily relatively to the frame, and an optionally controllable lock to permit or prevent the movement of the land wheel, said parts being arranged substantially as set forth whereby under the force of the draft the land wheel will lift the frame independently of the draft mechanism which is in front of the plowing mechanism and cause the power transmitter to simultaneously lift the plows.

9. In a plowing mechanism adapted to have draft mechanism applied thereto, the combination of the front furrow wheel, the rear furrow wheel, the land wheel adapted to be automatically moved bodily relatively to, and independently of, the furrow wheels under the force from the draft mechanism, a frame supported on said three wheels and normally held bodily fixed relatively to the ground but adapted to be moved vertically relatively to the land wheel, plows movable relatively to the frame, a power shaft mounted on the frame and connected to the plows for moving them, means connecting the shaft with the land wheel and movable therewith relatively to the frame and to the plows and an optionally controlled lock for said connecting means.

10. The combination of a wheel frame, ground wheels upon which said frame is supported, comprising a furrow wheel and a land wheel, a plow mounted to rise and fall relative to the frame, a swinging radius arm supported by the frame, the said land wheel being mounted upon the free end of said arm, lifting connections between said arm and the plow adapted to lift the plow when the arm is swung, means for locking the land wheel against rotation relative to the radius arm, means for locking the plow down in operative position, means for disengaging the last named lock and applying the wheel lock, means for automatically disengaging the wheel lock when the plow has been lifted, and means for adjusting the land wheel independently of the means for locking the plow down so as to cause the plow to work at different depths.

11. In a mechanism of the class described, the combination of a wheel frame, ground wheels comprising front and rear furrow wheels and a land wheel upon which said frame is supported, a plow, means connecting the plow to the wheel frame comprising a front bail and a rear bail, a swinging radius arm upon the frame upon which the said land wheel is mounted, the radius arm being supplemental to the said bails, lifting connections between said arm and the plow, means for locking the land wheel to said radius arm to cause the latter to swing and elevate the plow with respect to the wheel frame and to elevate the wheel frame with respect to the said land wheel, a foot lever for actuating said locking means, means for automatically locking the plow in elevated position, and a foot lever for releasing said last named locking means, substantially as set forth.

12. In a mechanism of the class described, the combination of a wheel frame, ground wheels comprising front and rear furrow wheels and a land wheel upon which said frame is supported, a plow, means connecting the plow to the wheel frame comprising a front bail and a rear bail, a swinging radius arm upon the frame upon which the said land wheel is mounted, the radius arm being supplemental to the said bails, lifting connections between said arm and the plow, means for locking the land wheel to said radius arm to cause the latter to swing and elevate the plow with respect to the wheel frame and to elevate the wheel frame with respect to the said land wheel, a foot lever for actuating said locking means, means comprising a toggle joint for automatically locking the plow in elevated position, and a foot lever for releasing said last named locking means, substantially as set forth.

13. In a mechanism of the class described, the combination of a wheel frame, ground wheels comprising front and rear furrow wheels and a land wheel upon which said frame is supported, a plow, means connecting the plow to the wheel frame comprising a front bail and a rear bail, a rock shaft on the frame independent of the plow, a swinging radius arm upon the shaft upon which the said land wheel is mounted eccentrically of the shaft, lifting connections between said arm and the plow, means for locking the land wheel to said radius arm to cause the latter to swing and elevate the plow with respect to the wheel frame and the wheel frame with respect to the said land wheel, a foot lever for actuating said locking means, means for automatically locking the plow in elevated position, and a foot lever for releasing said last named locking means, substantially as set forth.

In testimony whereof I affix my signature, in presence of two witnesses.

CHARLES H. MELVIN.

Witnesses:
Eugene L. Taylor,
John E. Poole.

It is hereby certified that in Letters Patent No. 1,112,149, granted September 29, 1914, upon the application of Charles H. Melvin, of Moline, Illinois, for an improvement in "Plows" an error appears in the printed specification requiring correction as follows: Page 1, line 89, for the syllables and words "tably mounted the upright spindle" read *they do not in themselves form a;* and that the said Letters Patent should be read with this correction therein that the same may conform to the record of the case in the Patent Office.

Signed and sealed this 10th day of November, A. D., 1914.

[SEAL.]

R. F. WHITEHEAD,
*Acting Commissioner of Patents.*